United States Patent [19]

Yamada et al.

[11] Patent Number: 5,280,506

[45] Date of Patent: Jan. 18, 1994

[54] STEAM ISOLATION VALVE

[75] Inventors: Katsumi Yamada, Fujisawa; Hiroshi Miyano, Kamakura; Noboru Saito; Tetsuzo Yamamoto, both of Yokohama; Hideaki Takahashi, Tokyo; Takashi Matsunaga; Shigeki Arai, both of Yokohama, all of Japan

[73] Assignee: Kabushiki Kaisha Toshiba, Kawasaki, Japan

[21] Appl. No.: 714,237

[22] Filed: Jun. 12, 1991

[30] Foreign Application Priority Data

Jun. 14, 1990 [JP] Japan .................................. 2-153873
Jun. 25, 1990 [JP] Japan .................................. 2-164205

[51] Int. Cl.⁵ ............................................ G21C 7/32
[52] U.S. Cl. ................................ 376/210; 376/211; 376/352; 251/318; 251/333
[58] Field of Search ................... 376/352, 210, 211; 251/318, 333

[56] References Cited

U.S. PATENT DOCUMENTS

| | | | |
|---|---|---|---|
| 3,155,365 | 11/1964 | Hartung et al. | 251/31 |
| 3,410,518 | 11/1968 | Carsten | 251/31 |
| 3,597,016 | 8/1971 | Gachot et al. | 92/27 |
| 3,972,504 | 8/1976 | DiSabatino et al. | 251/82 |
| 4,096,881 | 6/1978 | Schabert et al. | 137/492 |
| 4,545,562 | 10/1985 | Feurgard et al. | 251/129.2 |

Primary Examiner—Donald P. Walsh
Assistant Examiner—Frederick H. Voss
Attorney, Agent, or Firm—Oblon, Spivak, McClelland, Maier & Neustadt

[57] ABSTRACT

A main steam isolation valve of a reactor power plant comprises a valve body provided with inlet and outlet portions through which a steam flows, a cylindrical valve disk accommodated in the valve body to be reciprocatingly movable therein along an inner peripheral surface of the valve body for opening and closing the steam flow inlet portion and a driving mechanism secured to the valve body and operatively connected to the valve disk for reciprocatingly moving the valve disk in the valve body. A coupling member is applied to an end opening of the valve body for holding the valve disk when the valve disk is shifted to a position fully opening the inlet portion. A tubular wall member is integrally formed with the valve body so as to surround the valve disk with a gap therebetween when the valve disk is fully opened. A guide rib is further disposed to the valve body for causing asymmetric steam flow in the inlet portion of the steam flow of the valve body.

20 Claims, 15 Drawing Sheets

F I G. 18
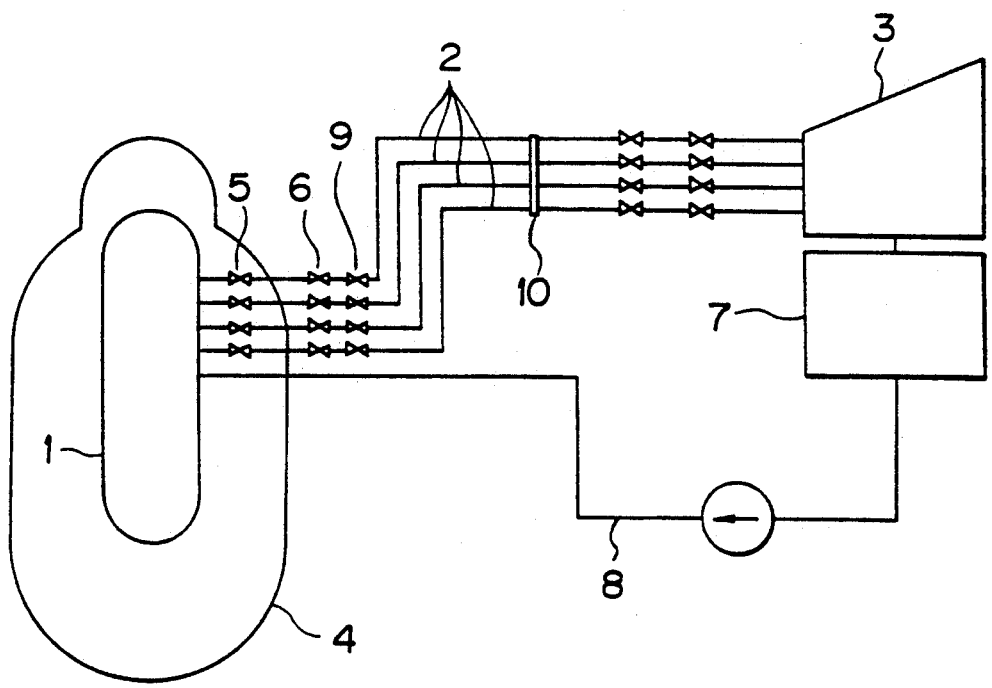

STEAM ISOLATION VALVE

BACKGROUND OF THE INVENTION

The present invention relates to a main steam isolation valve particularly of a boiling water reactor (BWR) plant for suppressing oscillation of a valve disk of the steam isolation valve.

Generally, in a BWR plant, a reactor pressure vessel is directly connected to a steam turbine through a plurality of main steam pipes, and first and second main steam isolation valves are incorporated to each of the main steam pipes inside and outside of the reactor container. The reactor pressure vessel is isolated as occasion demands by closing these main steam isolation valves.

The steam used in the steam turbine is condensed into condensate in a condenser and the condensate is then returned to the reactor pressure vessel.

In a conventional main steam isolation valve, inlet and outlet end portions of a valve body are connected to each of the main steam pipes and a valve disk is accommodated in the valve body in an axially reciprocal manner. The valve disk is provided with a valve shaft which is inclined inwardly, in an installed state, by about 45° with respect to the flow direction of the main-steam thereby to reduce flow resistance. The valve shaft is connected at one end to a driving means to reciprocatingly move the valve disk thereby to open or close the fluid, i.e. steam, passage.

The reciprocating motion of the valve disk is guided with a central guide rib and a bilateral pair of side guide ribs inwardly projecting at rear side portions of the valve body circumferentially apart from the central guide rib with a separation angle of about 120° with each other.

In such a structure, when the valve disk is rested on a valve seat, the valve disk is fully closed and the valve disk is upwardly lifted thereby to fully open a valve port.

In the conventional structure of the main steam isolation valve, since the bottom portion of the valve disk is held, at its fully opened state, with substantially the half portion thereof being projected into the fluid passage, the projected bottom portion is exposed to the steam flow, thus being subjected to fluid pressure in the main steam flowing direction and a direction normal thereto. Because the fluid pressure is in proportion to two squares of the fluid velocity, the valve disk may be oscillated in case of high fluid velocity. When the valve disk is oscillated, the central guide rib is rubbed with the valve disk with each other, resulting in the wear thereof and hence causing the leakage of the steam even in the case of the fully closed state of the valve.

Furthermore, since the steam flow is prevented by the paired side guide ribs and the valve disk, the pressure is locally increased at the upstream side of the steam flow, and since a force for pressing the valve disk against the side guide rib sides, friction force between the guide ribs and the valve disk is increased, thus the degree of wear therebetween being also increased, resulting in the increased possibility of causing the leakage of the steam.

SUMMARY OF THE INVENTION

An object of the present invention is to substantially eliminate the defects and drawbacks encountered in the prior art described above and to provide a steam isolation valve, particularly of a main steam isolation valve for a reactor power plant, capable of effectively suppressing oscillation of a valve disk of the isolation valve thereby to improve a reliance thereof during the valve disk opening and closing operations.

This and other objects can be achieved according to the present invention by providing, in one aspect, a steam isolation valve comprising a valve box provided with inlet and outlet portions through which a steam flows and an end opening, a valve disk accommodated in the valve body to be reciprocatingly movable therein along an inner peripheral surface of the valve body for opening and closing the steam flow inlet portion, a driving mechanism secured to the valve body and operatively connected to the valve disk for reciprocatingly moving the valve disk body in the valve body, and a coupling member applied to the end opening of the valve body for holding the valve disk when the valve disk is shifted to a position fully opening the inlet portion.

The open end of the valve disk has a tapered surface which is firmly engaged with a tapered surface of the coupling member.

In another aspect of the present invention, there is provided a steam isolation valve comprising a valve body provided with inlet and outlet portions through which a steam flows and an end opening, a valve disk accommodated in the valve disk body to be reciprocatingly movable therein along an inner peripheral surface of the valve body for opening and closing the steam flow inlet portion, a driving mechanism secured to the valve body and operatively connected to the valve disk for reciprocatingly moving the valve disk body in the valve body, and a tubular wall member integrally formed with the valve body, the valve disk being accommodated in an inner hollow portion of the tubular wall member with a gap therebetween when the valve disk is shifted to a position fully opening the inlet portion.

In a further aspect of the present invention, there is provide a steam isolation valve comprising a valve body provided with inlet and outlet portions through which a steam flows and an end opening, a valve disk accommodated in the valve body to be reciprocatingly movable therein along an inner peripheral surface of the valve body for opening and closing the steam flow inlet portion, a driving mechanism secured to the valve body and operatively connected to the valve disk for reciprocatingly moving the valve disk body in the valve box, and a tubular wall member integrally formed with the valve body, and a steam flow guide means disposed for the valve body for guiding the steam flow from the inlet portion of the valve body.

The guide means comprises a central guide rib disposed at the inlet portion of the valve body and side guide ribs formed integrally with an inner peripheral surface of the valve body at portions circumferentially apart from the central guide rib. The central guide rib may be formed so as to have a various arrangement for changing the steam flow velocity on both the side of the central guide rib at the inlet portion of the valve body.

According to the characters of the present invention described above, in one aspect, when the valve disk is fully opened, the coupling member is detachably engaged with the valve disk. Since the coupling member is secured to the valve body, the valve disk is firmly secured to the valve body through the coupling member when the valve disk fully closes the inlet portion of the valve body, thus the oscillation of the valve disk due to the steam flow being suppressed. Accordingly, the friction and, hence, the wearing between the valve disk and the associated members slidably engaged with the valve disk can be significantly reduced, resulting in the prevention of the steam from leaking and in the improved reliance of the steam isolation valve itself.

In another aspect, when the valve disk is fully opened, the valve disk is accommodated in the tubular wall member formed integrally with the valve body, so that the direct striking of the steam flow against the valve disk can be prevented. Accordingly, the oscillation of the valve disk due to the steam flow can be suppressed. The friction and, hence, the wearing between the valve disk and the associated members slidably engaged with the valve disk can be significantly reduced, resulting in the prevention of the steam from leaking and in the improved reliance of the steam isolation valve itself.

In a further aspect, since the steam flow sectional areas are made asymmetric around the valve disk by the specific location or arrangement of the guide rib, the flow velocities of the steams on both the sides of the guide rib differ from each other and, hence, there causes a difference between the static pressures of the steam flowing on both the sides of the guide rib. Accordingly, unidirectional force is always caused from the high static pressure side steam from to the low static pressure side steam flow, thus effectively suppressing the oscillation of the valve disk. Furthermore, substantially the same effects as described with respect to the above aspects can be also attained.

BRIEF DESCRIPTION OF THE DRAWINGS

In the accompanying drawings:

FIG. 18 is an illustration of a duct system of a reactor power plant to which the main steam isolation valve of the present invention is applicable;

DESCRIPTION OF THE PREFERRED EMBODIMENTS

Figure 1:
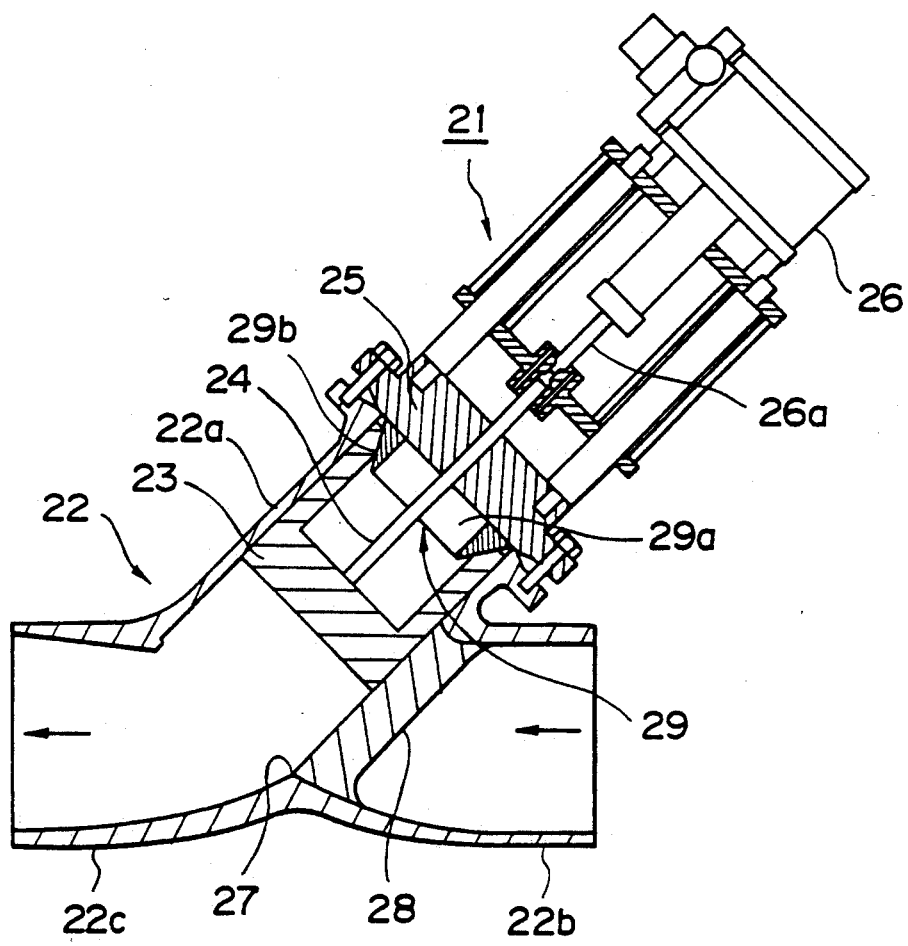
FIG. 1 is a longitudinal sectional view of a steam isolation valve according to one embodiment of the present invention.

For a better understanding of the present invention, general aspect and conventional art of the present invention will be first described with reference to FIGS. 18 to 20.

First, referring to FIG. 18, generally, in a boiling water reactor (BWR) plant, a reactor pressure vessel 1 is directly connected to a steam turbine 3 through a plurality, four for example in the illustration, of main steam lines 2, and first and second main steam isolation valves 5 and 6 are incorporated to each of the main steam lines 2 inside and outside of the reactor container 4. The reactor pressure vessel 1 is isolated as occasion demands by closing the main steam isolation valves 5 and 6. The steam used in the steam turbine 3 is condensed into condensate in a condenser 7 and the condensate is then returned to the reactor pressure vessel 1 through a condensate return line 8.

In FIG. 18, a third main steam valve 9 is also incorporated on the way of the steam line 2, and reference numeral 10 denotes a header.

Figure 19:
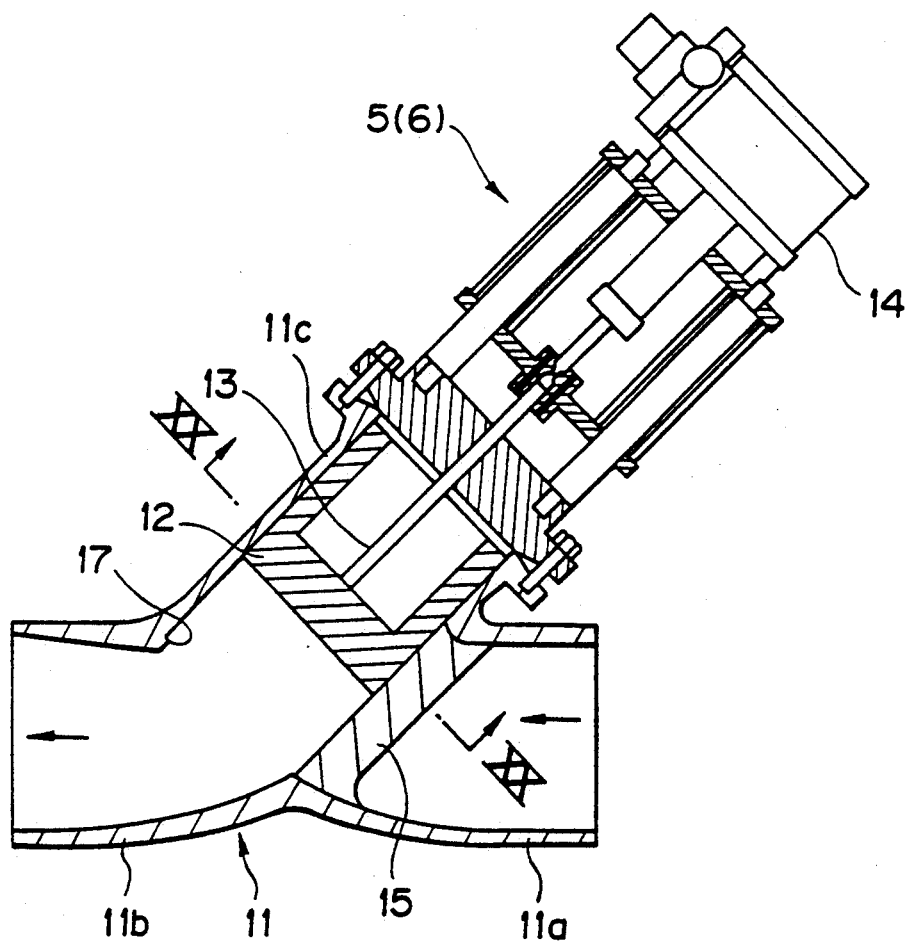
FIG. 19 is a longitudinal sectional view of a conventional steam isolation valve.

Referring to FIG. 19, in a conventional main steam isolation valve 5 or 6 provided with a valve body 11, inlet and outlet end portions 11a and 11b of the valve body 11 are connected to each of the main steam lines 2 and a cylindrical valve disk 12 is accommodated in a valve disk accommodation portion 11c of the valve body 11 in an axially reciprocal manner. The valve disk 12 is provided with a valve shaft 13 which extends and is inclined inwardly, in an illustrated and installed state, by about 45° with respect to the flow direction, arrowed in FIG. 19, of the main steam thereby to reduce flow resistance. The valve shaft is connected at one end to a driving means 14 to move reciprocatingly the valve disk 12 thereby to open or close the fluid passage.

Figure 20:
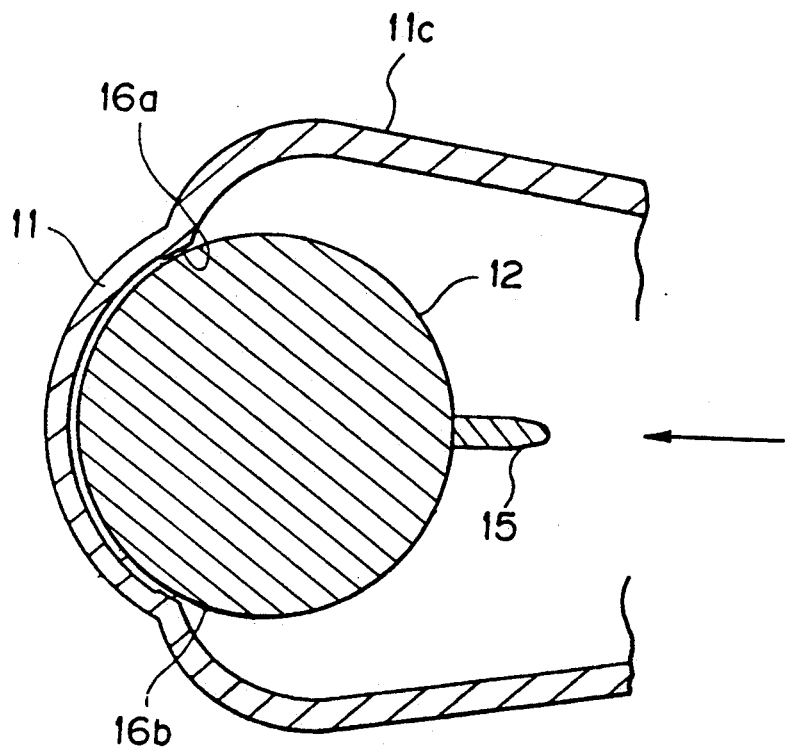
FIG. 20 is a sectional view taken along the line XX—XX of FIG. 19.

As shown in FIG. 20, the reciprocating motion of the valve disk 12 is guided by means of a central guide rib 15 and a bilaterally pair of side guide ribs 16a and 16b inwardly projecting at rear side portions of the valve body 11 circumferentially apart from the central guide rib 15 with a separation angle of about 120° with each other.

In such a structure, when the valve disk 12 is rested on a valve seat 17, the valve disk 12 is fully closed and the valve disk 12 is upwardly lifted thereby to fully open a valve port.

The conventional structure of the main steam isolation valve, however, involves problems or defects described hereinbefore.

Accordingly, the present invention conceived for substantially eliminating the described problems or defects encountered in the prior art will be described hereunder by way of preferred embodiments in conjunction with FIGS. 1 to 17, in which like reference numerals are added to those elements or members corresponding to those of the respective embodiments.

FIG. 1 shows a longitudinal sectional view of a first embodiment of the main steam isolation valve according to the present invention.

Referring to FIG. 1, a main steam isolation valve 21 includes a valve body 22 having a valve disk accommodation portion 22a in which a valve disk 23 is accommodated. The valve body 22 is provided with inlet and outlet end portions 22b and 22c connected to the main steam line 2, FIG. 18, and the main steam flows as shown by arrows from the inlet end portion 22b towards the outlet end portion 22c in the valve body 22.

The valve disk 23 is composed of a bottomed cylindrical member and accommodated in the portion 22a so that a valve shaft 24 connected to the central portion of the bottom of the valve disk 23 inwardly, as viewed, i.e. in a steam flow direction, inclines by about 45° with respect to the axis of the inlet end portion 22b. A flange portion 25 is formed to the upper, as viewed, end of the valve disk accommodation portion 22a to air-tightly close the opening thereof.

A valve disk driving mechanism 26 is mounted to the flange portion 25 and comprises an output shaft 26a connected to the valve shaft 24 thereby to reciprocate the valve disk 23 in the axial direction thereof along the inner peripheral surface of the valve body 22 to open or close a valve port, i.e. fluid passage.

Namely, as shown in FIG. 1, when the driving mechanism 26 is actuated to obliquely lift the valve disk 23, the valve port is fully opened, whereas when the valve disk 23 is seated on a valve seat 27 disposed around the valve port, the valve port is fully closed. Such reciprocating motion of the valve disk 23 is guided by a central guide rib 28 and a pair of side guide ribs disposed apart, in a circumferential direction of the valve disk 23, from the central guide rib 28 with a separation angle of about 120° with each other.

Figure 2A:
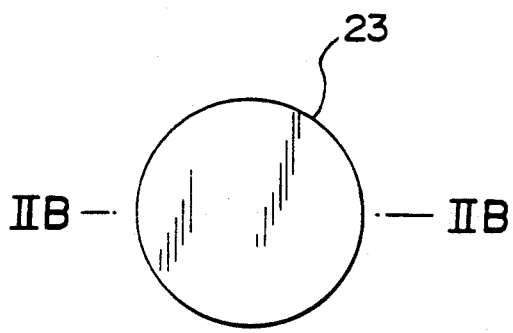
FIG. 2A is a bottom view of a valve disk of the isolation valve of FIG. 1.
Figure 2B:
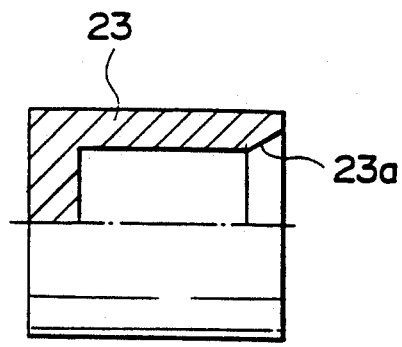
FIG. 2B is a sectional view taken along the line IIB—IIB of FIG. 2A.

A coupling 29 is secured to the valve body 22 and detachably fitted to the opening of the valve disk 23 so as to abut against the flange portion 25. Referring to FIGS. 2A and 2B, the valve disk 23 has a bottomed cylindrical shape and has an upper open end having an inner tapered surface 23a.

As shown in FIG. 1, the coupling 29 has a cylindrical body 29a having a lower open end portion having an outer tapered surface having a shape in conformity with the shape of the tapered surface 23a of the valve disk 23. Accordingly, when the coupling 29 is fitted into the valve plug 23, both the tapered surfaces 23a and 26a are engaged with each other.

According to such a structure, when the valve disk 23 is fully open, the upper open end thereof is fixedly engaged with the coupling 26 and the valve disk 23 is secured to the valve body 22 through the coupling 29 and the flange portion 25, so that, when the valve disk 23 is fully opened, the oscillation thereof is significantly reduced even if the lower portion of the valve disk 23 projects towards the main steam passage. Accordingly, the friction of the valve disk 23, the central guide rib 28 and the side guide ribs caused by the oscillation of the valve disk 23 are reduced, resulting in the reduction of the wearing thereof, thus preventing the fluid from leaking during the fully closing operation of the main steam isolation valve 21.

Figure 3:
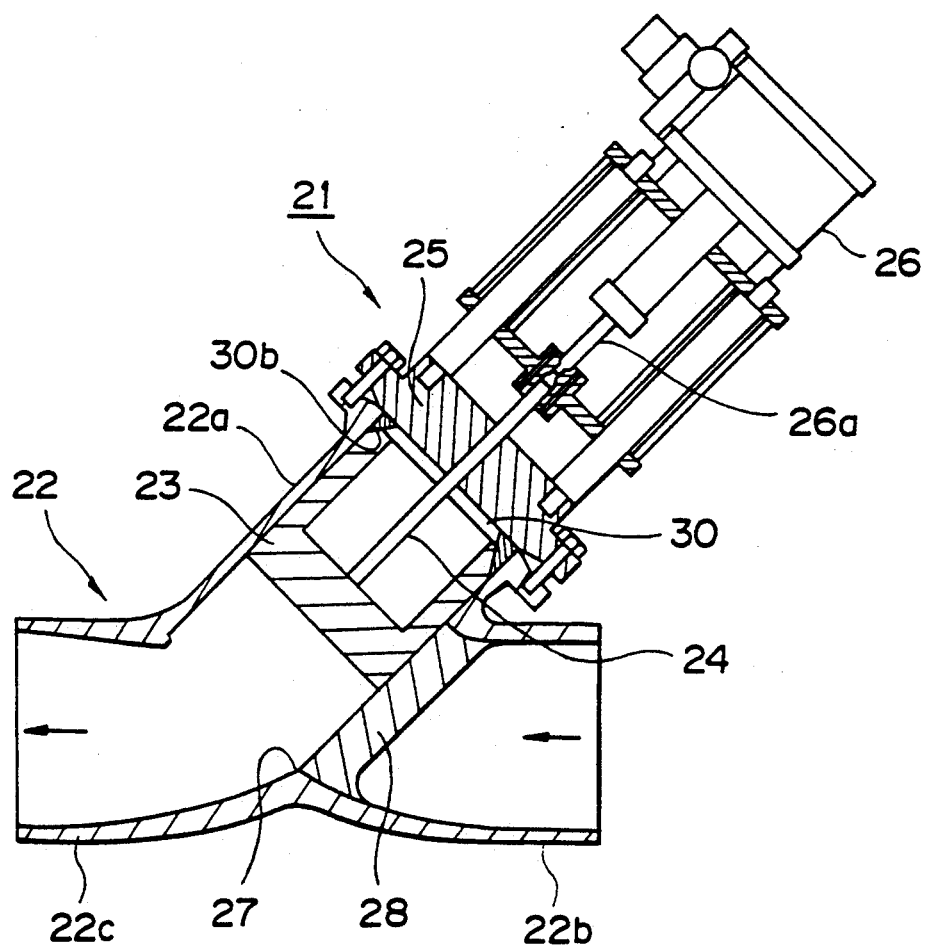
FIG. 3 is a view similar to that of FIG. 1 showing a modification thereof.
Figure 5:
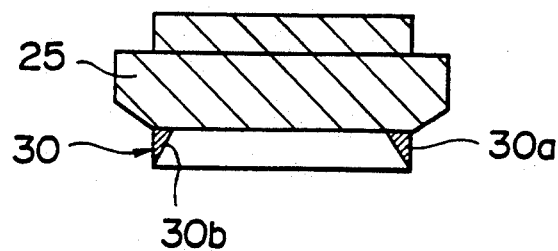
FIG. 5 is a sectional view showing an engagement of a flange portion and a coupling of the isolation valve shown in FIG. 3.

The coupling 29 may be formed as shown in FIGS. 3, 5 and 6 by reference numeral 30.

Figure 4A:
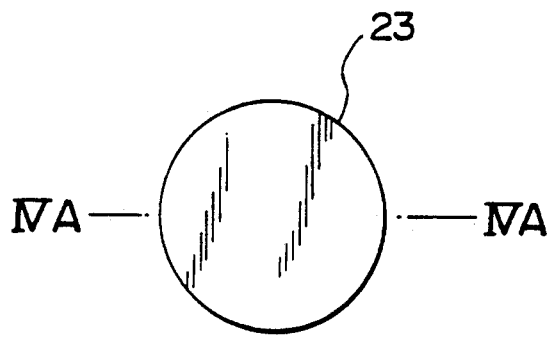
FIGS. 4A and 4B are views similar to those of FIGS. 2A and 2B, respectively, in connection with the modification of FIG. 3.
Figure 4B:
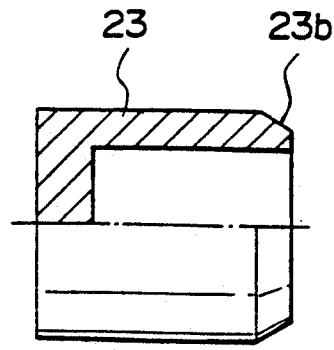

Namely, referring to FIGS. 3 and 4, a tapered surface 30b is formed to the inner peripheral portion of a cylindrical body 30a of the coupling 30 and an outer tapered surface 23b is formed to the outer peripheral portion of the upper open end portion of the valve disk 23 so as to be firmly engaged with the inner tapered surface 30b of the coupling body 30a. In this modified embodiment, substantially the same effects as those described hereinbefore can be attained.

Figure 6A:
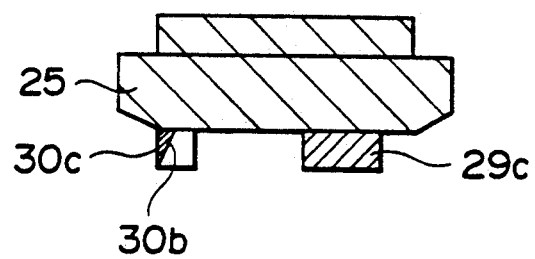
FIG. 6A is a sectional view showing a modification of FIG. 5.
Figure 6B:
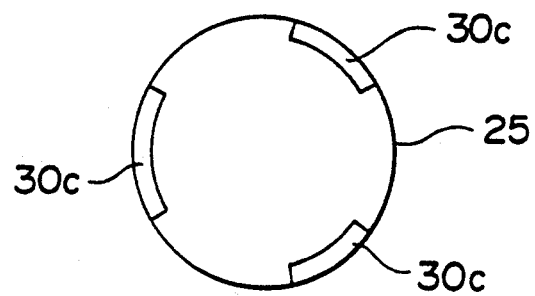
FIG. 6B is a bottom view of the modification of FIG. 6A.

As shown in FIGS. 6A and 6B, the coupling 30 may be composed of a plurality of arcuate coupling compartments each having a tapered surface as described above.

Figure 7:
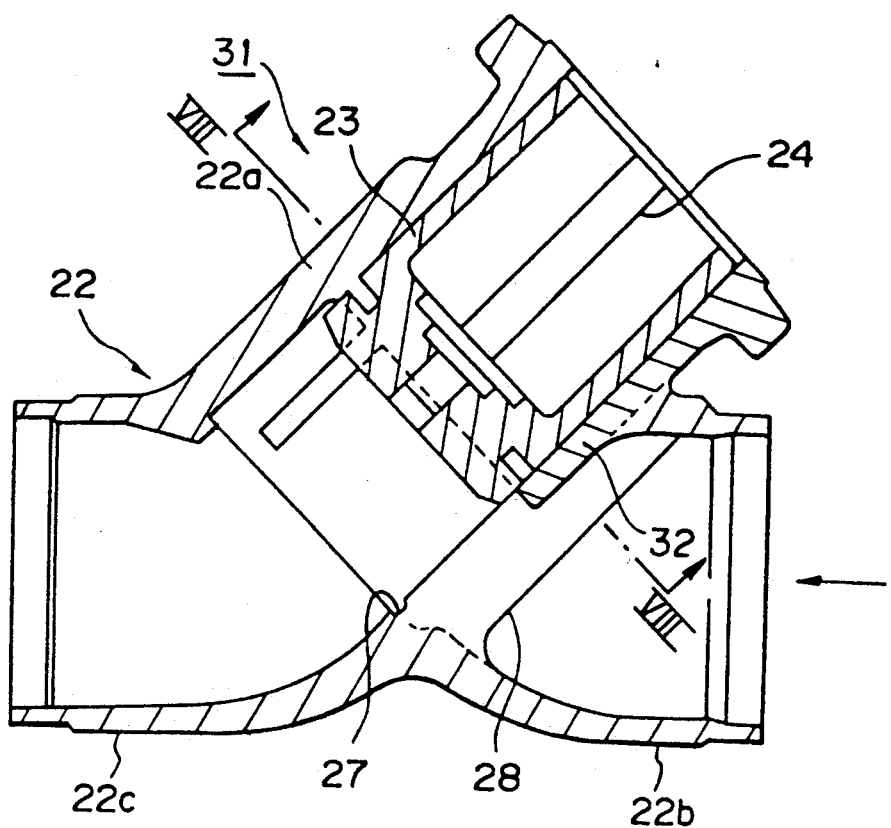
FIG. 7 is a longitudinal sectional view of a steam isolation valve, partially eliminated, according to another embodiment of the present invention.
Figure 8:
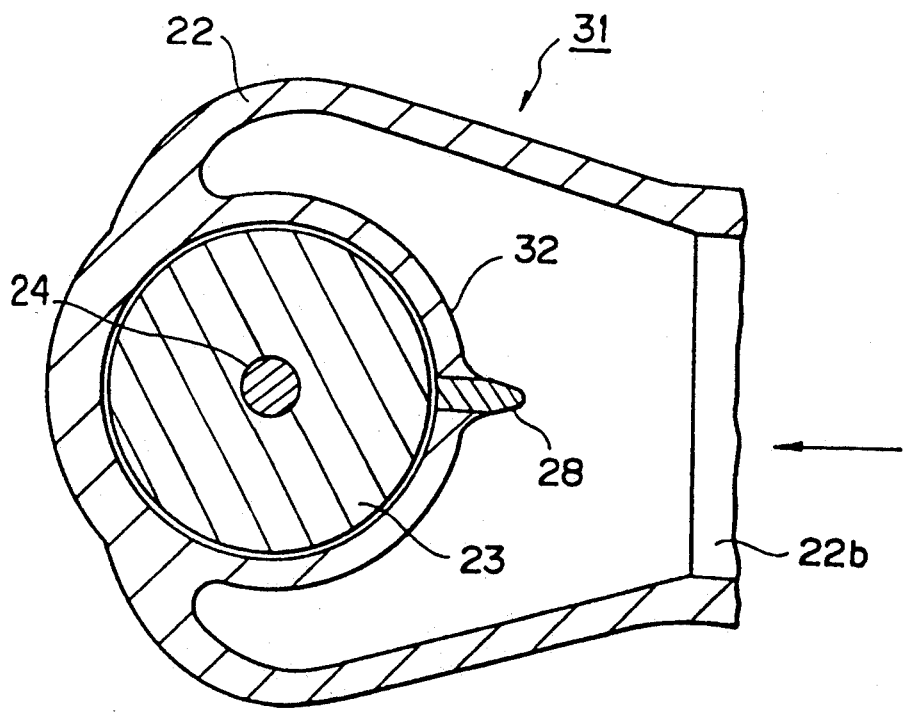
FIG. 8 is a sectional view taken along the line VIII—VIII of FIG. 7.

FIGS. 7 and 8 represent a second embodiment of the main steam isolation valve 31, the driving means of the structure shown in FIG. 1 being eliminated, in which FIG. 7 is a longitudinal section thereof and FIG. 8 is a sectional view taken along the line VIII—VIII of FIG. 7.

In the second embodiment, as shown in FIGS. 7 and 8, the main steam isolation valve 31 has such main feature as that a tubular wall 32 is provided integrally with the valve body 22 so as to surround the outer periphery of the valve disk with a slight gap therebetween.

Namely, as shown in FIG. 8, the tubular wall 32 extends rearwardly, leftwardly as viewed, along the peripheral surface of the valve disk 23 and is integrated with the valve body 22 at the rear end portion of the tubular wall 32.

According to this structure, since substantially the entire structure of the valve disk 23 is accommodated in the tubular wall 32 in the fully opened state of the valve disk 23, the direct striking of the steam flow on the valve disk 23 can be prevented, thus reducing the oscillation of the valve disk 23. This results in the reduction of the friction between the valve disk 23 and the central and side guide ribs, thus also reducing the wearing. Accordingly, the fluid can be prevented from leaking during the fully closing operation of the valve disk 23, thus improving the reliance of the valve disk 23 and, hence, the main steam isolation valve 31.

Figure 9:
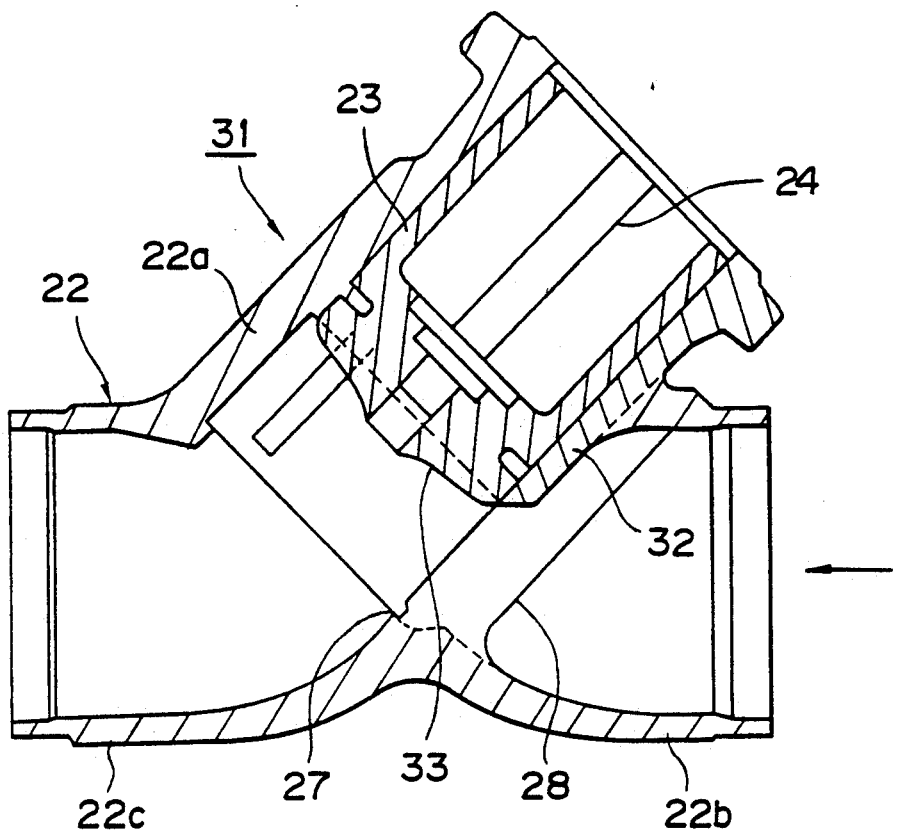
FIG. 9 is a view similar to that of FIG. 7 showing a modification thereof.

In a modification shown in FIG. 9, the valve disk 23 may be formed so as to have outwardly arcuate bottom 33 thereby to effectively reduce resistance against the steam flow striking the outwardly protruded bottom 33 of the valve disk 23, thus stabilizing the steam flow and hence further improving the oscillation suppressing performance.

Figure 10:
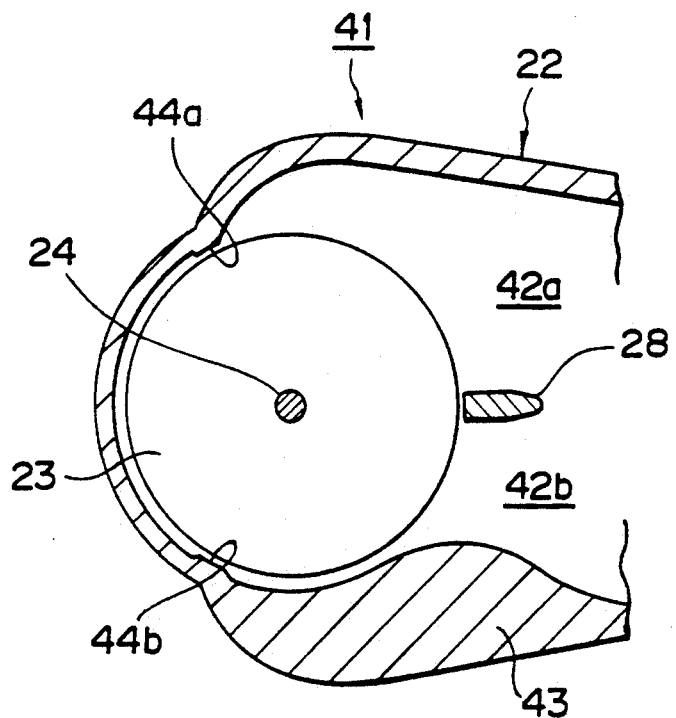
FIG. 10 is a sectional view of a valve body of a steam isolation valve, partially eliminated, according to further embodiment of the present invention.

FIG. 10 is a view similar to that of FIG. 8 and represents a third embodiment of a main steam isolation valve 41 according to the present invention.

Referring to FIG. 10, reference numerals 42a and 42b denote fluid passages in the valve body 22 with the guide rib 28 being disposed at the central position of the passages. In this embodiment, one side peripheral wall of the valve body 22, on the side of the fluid passage 42a in the illustration, is formed to be thick. Namely, an inwardly protruded portion 43 is integrally formed to the valve body 22 and the cross sectional flow area of the passage 42a is hence made smaller than that of the passage 42a, thus providing bilaterally asymmetric cross sectional area.

In FIG. 10, reference numerals 44a and 44b denote a pair of side guide ribs for guiding the reciprocating motion of the valve disk 23 at the rear portion thereof.

The side guide ribs 44a and 44b are formed integrally with the inner surface of the valve body 22 and disposed circumferentially apart from each other with a separation angle of about 120° with the center being the central guide rib 28.

According to this embodiment, when the main steam isolation valve 41 is fully opened, the flow velocity of the main steam passing the fluid passage 42a is made always lower than that flowing in the fluid passage 42a and, accordingly, the static pressure in the fluid passage 42b is always high.

For this reason, there always causes one-sidedly unidirectional force for forcing the valve disk 23 from the passage 42b of high static pressure side towards the passage 42a of low static pressure side, so that the oscillation of the valve disk 23 reciprocating between these passages 42a and 42b can be then suppressed.

Figure 11:
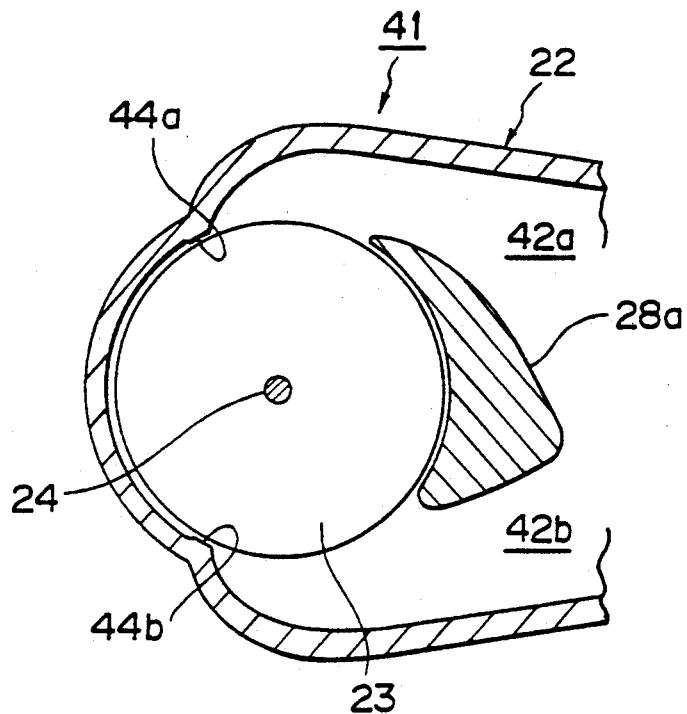
FIGS. 11 to 13 are views similar to that of FIG. 10 representing modifications thereof.

In a further modification, it may be possible to form a protruded portion to the central guide rib 28a as shown in FIG. 11 instead of the location of the protruded portion 43 of FIG. 10.

Referring to FIG. 11, the central guide rib 28a has a bilaterally asymmetric shape of substantially triangle so as to have a portion on the side of the fluid passage 42a having a sectional area smaller than that of a portion on the side of the other fluid passage 42b. Accordingly, this embodiment can attain substantially the same effect as that attained by the main steam isolation valve 41. The shape of the central guide rib 28a is not limited to such triangular shape and other modifications may be made as far as substantially the same effect is attained.

Figure 12:
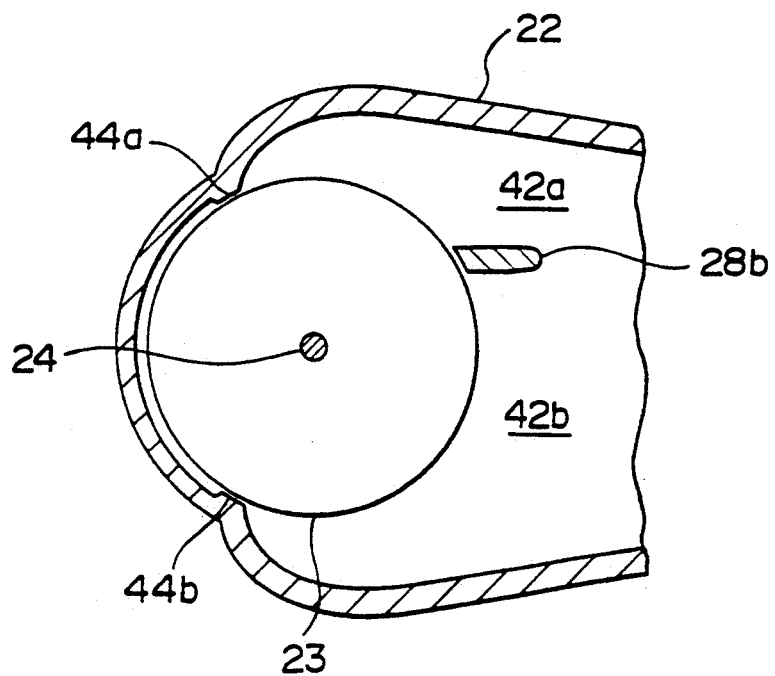
Figure 13:
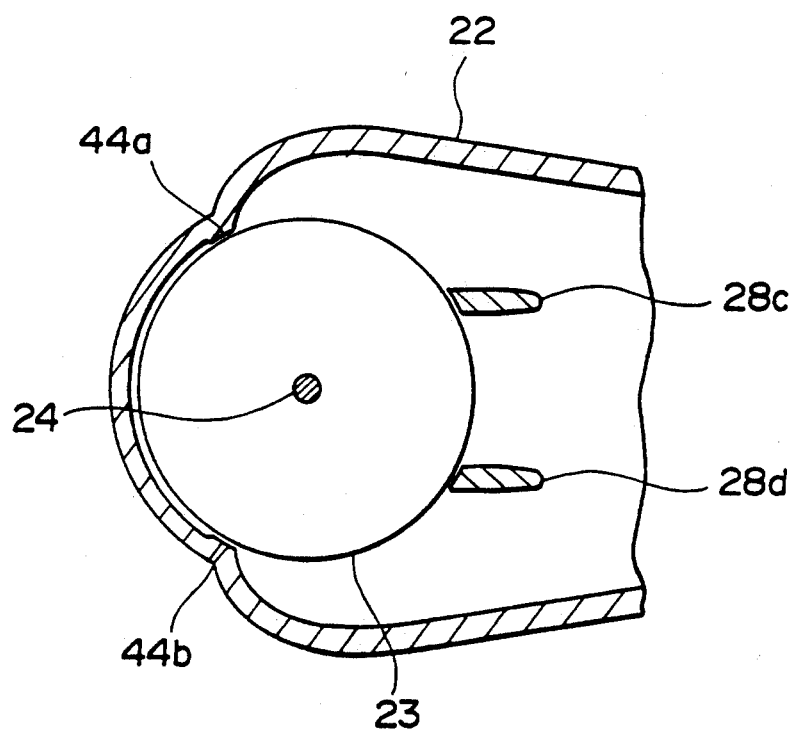

FIGS. 12 and 13 represents further modifications of the central guide ribs of the present invention in which like reference numerals are added to elements or members corresponding to those used for the disclosure of the aforementioned embodiments or modifications.

Referring to FIG. 12, the central guide rib 28b is disposed on the side of the steam flow passage 42a from the central portion of the flow passages 42a and 42b. According to this modified embodiment of the central guide rib 28b, substantially the same effect as that attained by the embodiment represented by FIG. 10 or 11 can be attained.

Referring to FIG. 13, two central guide ribs 28c and 28d are arranged to the front, rightward as viewed, side of the valve disk 23 in symmetrical arrangement with respect to the valve shaft 24. According to this structure, the fluid pressure of the main steam is made stable between the two central guide ribs 28c and 28d, whereby the oscillation of the valve disk 23 can be significantly suppressed.

Figure 14:
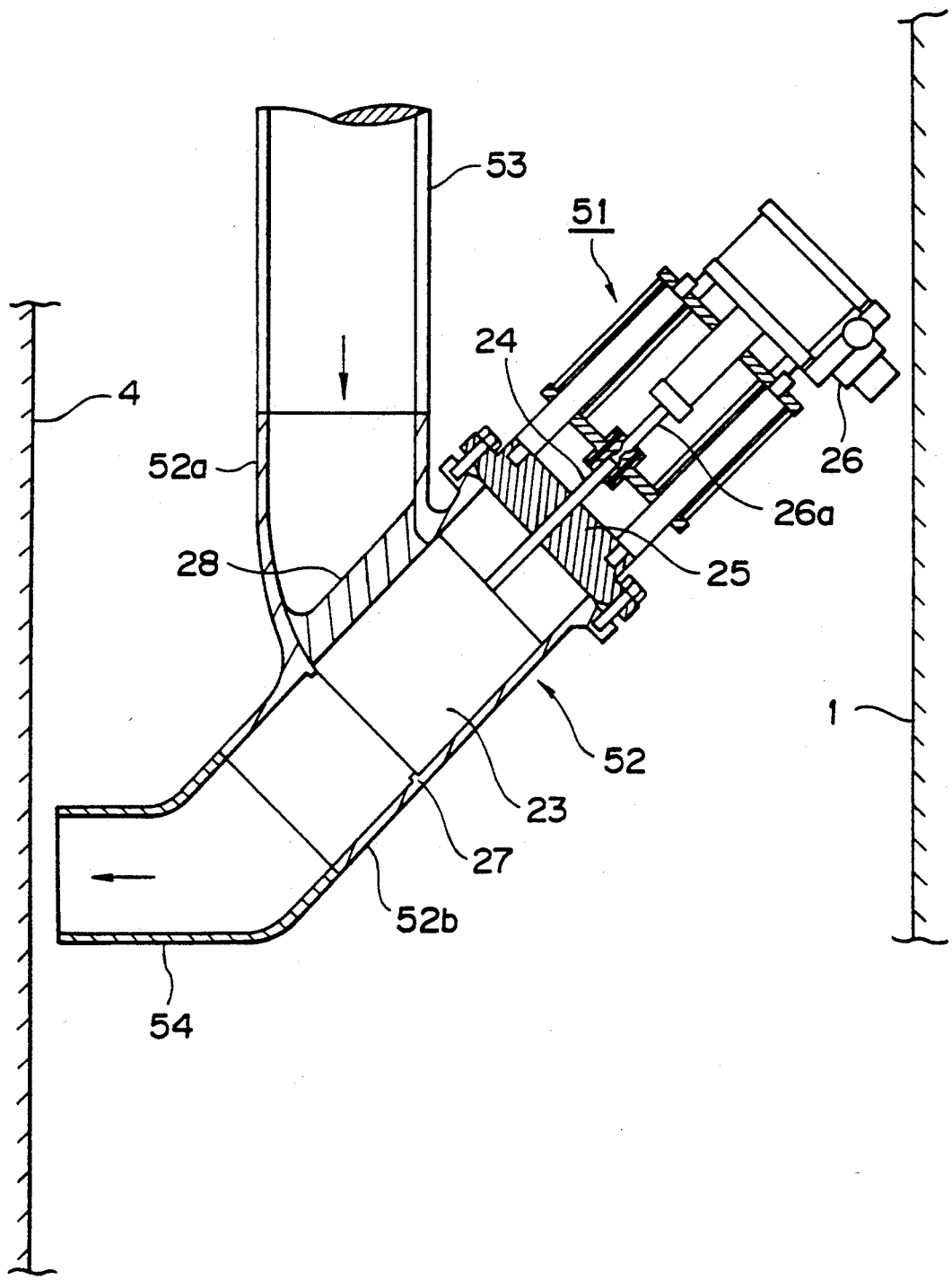
FIG. 14 is a sectional view similar to that of FIG. 1 in a case where the steam isolation valve is disposed inside a reactor container.

FIG. 14 represents a fourth embodiment of the main steam isolation valve 51 according to the present invention, in which an inlet end portion 52a of a valve body 52 of the main steam isolation valve 51 stands vertically, as viewed, so as to be substantially parallel to side walls of the reactor pressure vessel 1 and the reactor container 4 (FIG. 18) and an outlet end portion 52b is mounted to a horizontally near portion with a predetermined angle. In this embodiment, the inlet side duct 53 connected to the inlet end portion 52a can be constructed to have a long length and it is also possible to make large a bent angle of an outlet side duct 54 connected to the outlet end portion 52b. According to these structures, the variation of pressure of the main steam flowing in the valve body 52 can be effectively made small, thus suppressing the oscillation of the valve disk 23. It is to be noted that the embodiment of FIG. 14 may be applied to the afore- mentioned embodiments.

Figure 15:
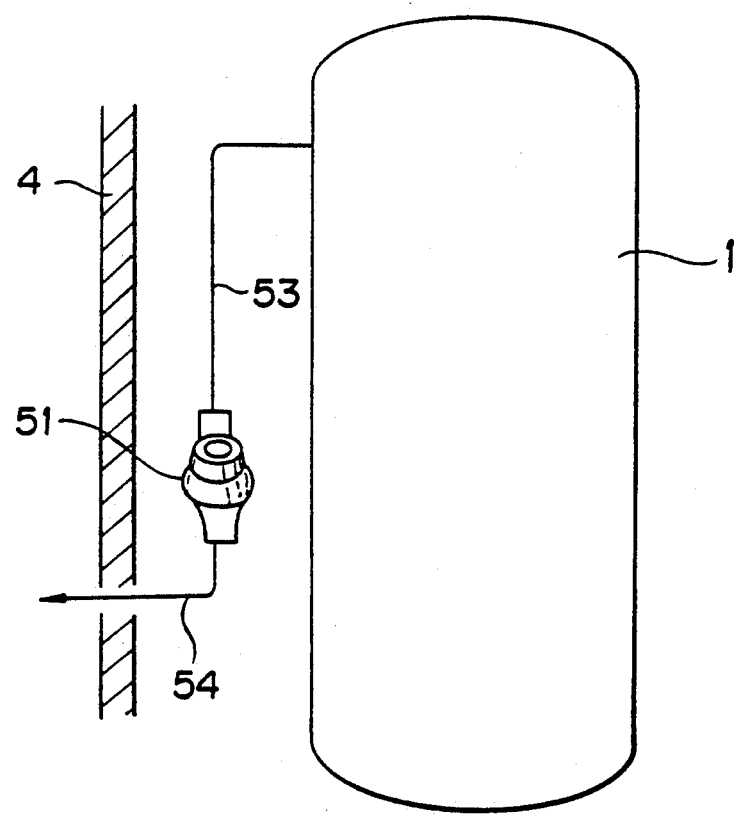
FIG. 15 is a general view in relation to FIG. 14.

FIG. 15 shows an arrangement of the main steam isolation valve 51 shown in FIG. 14, in which the isolation valve 51 stands vertically so as to be substantially parallel to the side walls of the reactor pressure vessel 1 and the reactor container 4 (FIG. 18), and the valve shaft 24 is directed to the circumferential direction of the reactor pressure vessel 1. According to such arrangement, the length of the inlet side duct 53 is made sufficiently long and the bent angle of the outlet side duct 54 can be made large, whereby the variation of pressure of the main steam flowing in the valve box 54 can be significantly reduced and the oscillation of the valve disk 23 can be hence suppressed.

Figure 16:
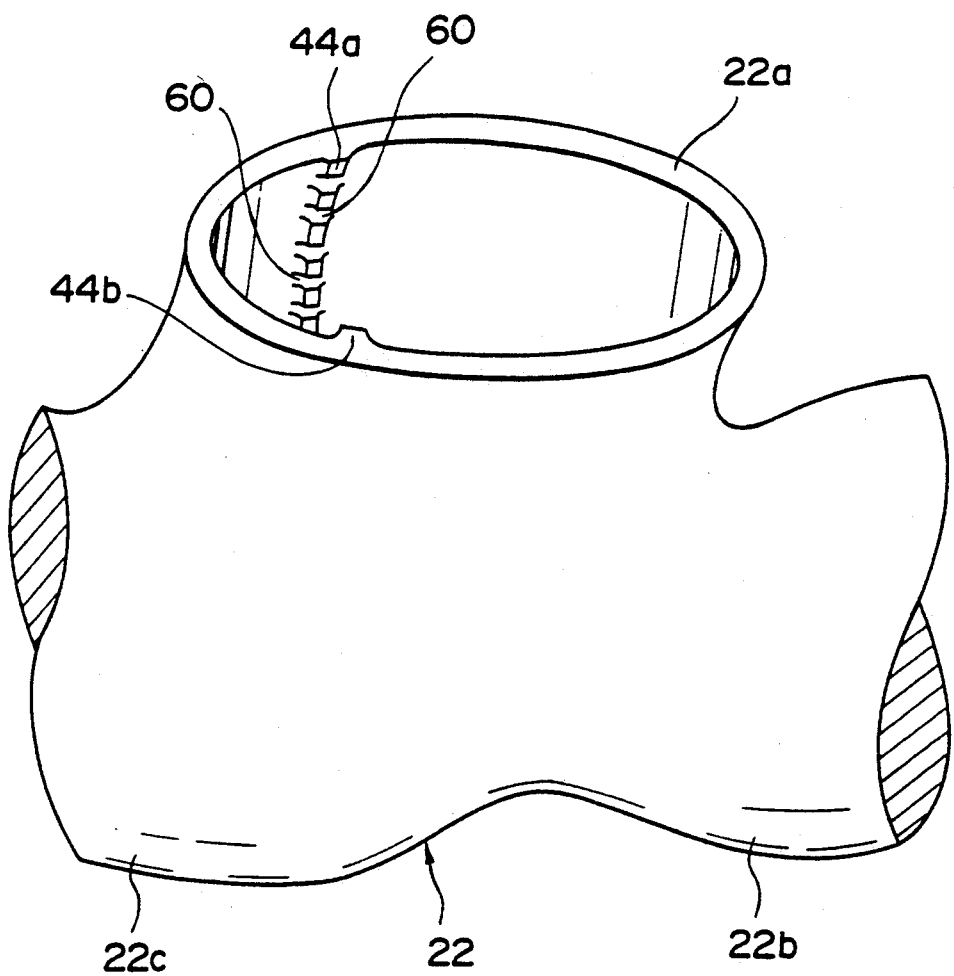
FIG. 16 is a perspective view of a modification of a side guide rib formed to a valve body shown in FIG. 10.

FIG. 16 shows a portion of the valve body 22 in which the paired side guide ribs 44a and 44b are provided with cutout slits 60 for escaping pressure along the circumferential direction of the valve disk accommodation portion 22a. These slits 60 are formed to the side guide ribs 44a and 44b in their longitudinal directions with predetermined pitches.

According to this structure, the main steam flows between the inner peripheral surface of the valve body 22 and the rear side of the valve disk 23 through the slits 60, thus the pressure of the main steam being made substantially even. Accordingly, the force for forcing the valve disk 23 against the side guide ribs 44a and 44b can be reduced, resulting in the reduction of the friction and wear between the side guide ribs 44a and 44b and the outer rear peripheral surface of the valve disk 23 and preventing the main steam from leaking at the time of fully closing the valve, and the reliance of the main steam isolation valve can be hence improved.

Figure 17:
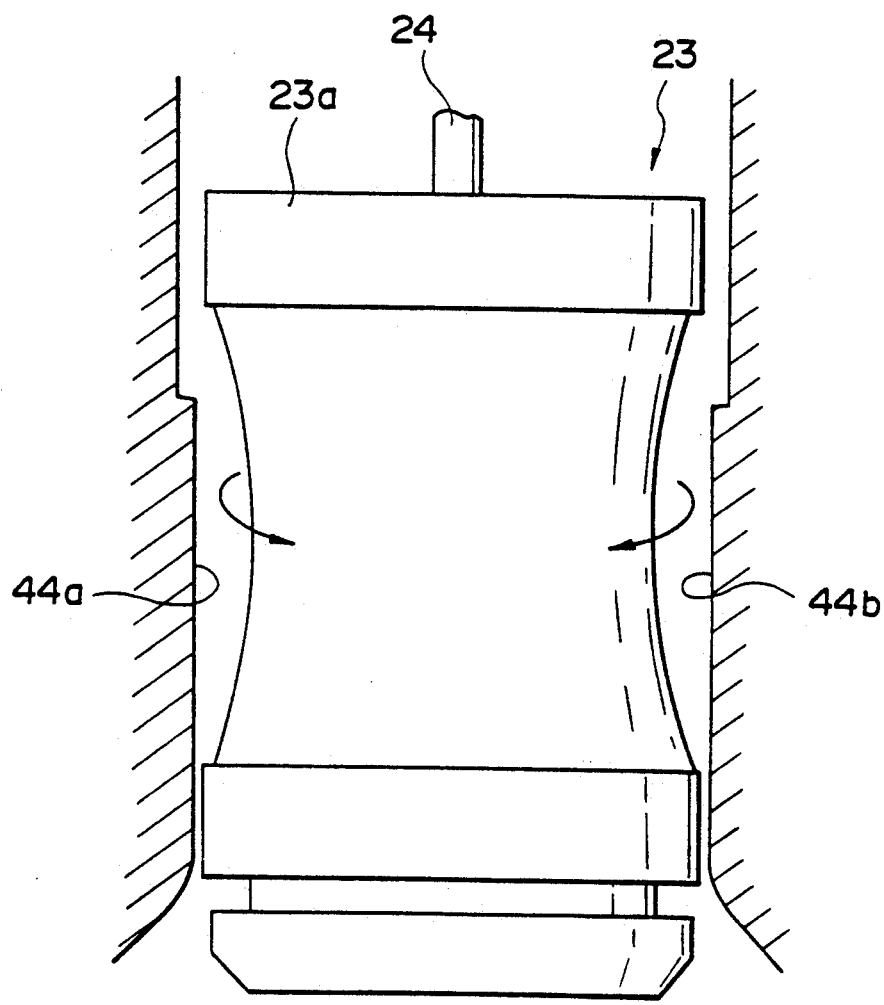
FIG. 17 is an illustration of a modified valve disk applicable to the aforementioned embodiments of the present invention.

As shown in FIG. 17, the valve disk 23 may be formed so that the valve disk body 23a thereof has a drum shape having a reduced diameter from the end portions towards the axially central portion thereof. According to this structure, the main steam is flows, as indicated by arrows, towards the rear side of the valve plug disk body 23a, i.e. the paired side guide rib sides, through the reduced diameter portion of the valve plug disk body 23a, whereby the pressure of the main steam can thus be made even and substantially the same effects as those described with reference to FIG. 16 can be achieved.

It is to be understood that the present invention is not limited to the described embodiments and modifications and many other changes and modifications may be made without departing from the scopes of the appended claims.

For example, embodiments or modifications constituted by the combinations of the described embodiments and modifications may be within the scope of the present inventions.

What is claimed is:

1. A steam isolation valve means comprising:
    a valve body provided with inlet and outlet portions through which a steam flows and an end opening;
    a substantially cylindrical valve disk body accommodated in the valve body to be reciprocatingly movable therein along an inner peripheral surface of the valve body for opening and closing the steam flow inlet portion;
    a drive means secured to the valve body and operatively connected to the valve disk body for reciprocating moving the valve disk body in the valve body; and means applied to the end opening of the valve body for holding the valve disk body when the valve disk body is shifted to a position fully opening the inlet portion
wherein:
said valve disk body is composed of a cylindrical valve disk having an inner hollow portion and a closed bottom and an open end, and said valve disk body holding means is composed of a valve disk holding coupling having an inner hollow portion and an outer configuration so to as to engageable with the open end of the valve disk.

2. A steam isolation valve means according to claim 1, wherein the open end of said valve disk has an inner periphery provided with an inwardly tapered surface and said coupling has an outer periphery provided with an outwardly tapered surface which is engageable with the tapered surface of the valve disk.

3. A steam isolation valve means according to claim 1, wherein the open end of said valve disk has an outer periphery provided with an outwardly tapered surface and said coupling has an inner periphery provided with an inwardly tapered surface which is engageable with the tapered surface of the valve disk.

4. A steam isolation valve means according to claim 1, wherein said coupling is composed of a plurality of arcuate portions to be engaged with the open end of the valve disk.

5. A steam isolation valve means according to claim 1, further comprising a steam flow guide means secured to the valve body for guiding the steam flow.

6. A steam isolation valve means according to claim 5, wherein said guide means comprises a central guide rib disposed at the inlet portion of the valve body and side guide ribs formed integrally with an inner peripheral surface of the valve body at portions circumferentially apart from the central guide rib.

7. A steam isolation valve means according to claim 6, wherein each of said side guide ribs is provided with a plurality of slits formed along the inner peripheral surface of the valve body with substantially equal intervals.

8. A steam isolation valve means according to claim 1, wherein said valve disk body has an outer diameter axially gradually reduced at a central portion thereof.

9. A steam isolation valve means according to claim 1, wherein said inlet end of the valve body is connected to a steam inlet duct, said inlet duct being arranged vertically in an actually installed state.

10. A steam isolation valve means according to claim 1, wherein the steam isolation valve is composed of a main steam isolation valve means to be disposed in a reactor plant including a reactor container and a reactor pressure vessel, said main steam isolation valve means being disposed inside and outside the reactor container.

11. A steam isolation valve means comprising:
a valve body provided with inlet and outlet portions through which a steam flows and an end opening;
a substantially cylindrical valve disk body accommodated in the valve body to be reciprocatingly movable therein along an inner peripheral surface of the valve body for opening and closing the steam flow inlet portion;
a drive means secured to the valve body and operatively connected to the valve disk body for reciprocatingly moving the valve disk body in the valve body; and
a tubular wall member integrally formed with the valve body, said valve disk body being accommodated in an inner hollow portion of the tubular wall member with a gap therebetween when the valve disk body is shifted to a position fully opening the inlet portion.

12. A steam isolation valve means according to claim 11, wherein said valve disk body is composed of a valve disk having an inner hollow portion and a closed bottom, said bottom having an outer surface centrally protruded outwardly.

13. A steam isolation valve means according to claim 11, further comprising a steam flow guide means secured to the valve body for guiding the steam flow.

14. A steam isolation valve means according to claim 11, wherein said guide means comprises a central guide rib disposed at the inlet portion of the valve body and side guide ribs formed integrally with an inner peripheral surface of the valve body at portions circumferentially apart from the central guide rib.

15. A steam isolation valve means according to claim 11, wherein the steam isolation valve is composed of a main steam isolation valve means to be disposed in a reactor plant including a reactor container and a reactor pressure vessel, said main steam isolation valve means being disposed inside and outside the reactor container.

16. A steam isolation valve means comprising:
a valve body provided with inlet and outlet portions through which a steam flows and an end opening;
a substantially cylindrical valve disk body accommodated in the valve body to be reciprocatingly movable therein along an inner peripheral surface of the valve body for opening and closing the steam flow inlet portion;
a drive means secured to the valve body and operatively connected to the valve disk body for reciprocatingly moving the valve disk body in the valve body; and
steam flow guide means disposed for the valve body for guiding the steam flow from the inlet portion of the valve body;
wherein:
said guide means comprises a central guide rib disposed at the inlet portion of the valve body and side guide ribs formed integrally with an inner peripheral surface of the valve body at portions circumferentially apart from the central guide rib; and
said central guide rib is disposed at a portion shifted from a central portion of a steam flow passage at the inlet portion of the valve body.

17. A steam isolation valve means according to claim 16, wherein said guide rib has an outer configuration for causing asymmetric steam flow on both sides of the central guide rib.

18. A steam isolation valve means according to claim 16, wherein said central guide rib comprises two parts symmetrically arranged with respect to an axis of the valve disk body.

19. A steam isolation valve means according to claim 16, wherein said valve body has wall portions having a thickness different from each other on both sides of the central guide rib for causing different steam flow on both sides of the central guide rib at the inlet portion of the valve body.

20. A steam isolation valve means according to claim 16, wherein the steam isolation valve is composed of a main steam isolation valve means to be disposed in a reactor plant including a reactor container and a reactor pressure vessel, said main steam isolation valve means being disposed inside and outside the reactor container.

* * * * *